Dec. 14, 1965     C. A. MIKUS     3,223,252
TREATMENT OF GLASS
Filed Oct. 31, 1962     10 Sheets-Sheet 1

INVENTOR.
CLIFFORD A. MIKUS
BY Oscar L. Spencer
ATTORNEY

Dec. 14, 1965    C. A. MIKUS    3,223,252
TREATMENT OF GLASS
Filed Oct. 31, 1962    10 Sheets-Sheet 2

FIG. 2

INVENTOR.
CLIFFORD A. MIKUS
BY
Oscar L. Spencer
ATTORNEY

Dec. 14, 1965  C. A. MIKUS  3,223,252
TREATMENT OF GLASS
Filed Oct. 31, 1962  10 Sheets-Sheet 4

FIG. 4

INVENTOR.
CLIFFORD A. MIKUS
BY
Oscar H Spencer
ATTORNEY

Dec. 14, 1965　　　　C. A. MIKUS　　　　3,223,252
TREATMENT OF GLASS

Filed Oct. 31, 1962　　　　　　　　　　　10 Sheets-Sheet 6

FIG. 6

INVENTOR.
CLIFFORD A. MIKUS
BY Oscar L. Spencer
ATTORNEY

Dec. 14, 1965    C. A. MIKUS    3,223,252
TREATMENT OF GLASS

Filed Oct. 31, 1962    10 Sheets-Sheet 7

INVENTOR.
CLIFFORD A. MIKUS
BY Oscar H. Spencer
ATTORNEY

Dec. 14, 1965   C. A. MIKUS   3,223,252
TREATMENT OF GLASS
Filed Oct. 31, 1962   10 Sheets-Sheet 8

INVENTOR.
CLIFFORD A. MIKUS
BY Oscar L. Spencer
ATTORNEY

United States Patent Office 3,223,252
Patented Dec. 14, 1965

3,223,252
TREATMENT OF GLASS
Clifford A. Mikus, Pittsburgh, Pa., assignor to Pittsburgh Plate Glass Company, Pittsburgh, Pa., a corporation of Pennsylvania
Filed Oct. 31, 1962, Ser. No. 234,475
15 Claims. (Cl. 214—1)

This invention relates to the treatment of glass, particularly to the processing of glass sheets upon a fluid. It is specifically concerned with the transportation of fluid supported glass sheets in a quenching operation.

In the fabrication of glass sheets into end products having characteristics and uses different from the original product, as by bending, coating or tempering the sheets or by a combination of such techniques, the glass is heated to a temperature above that at which the major surfaces or the contour thereof will be changed by a deforming stress or contact with solids. Thereafter the glass sheets must be cooled to a temperature below that at which they deform prior to further handling. Where it is desired to strengthen the glass sheets, as by tempering, the glass must be cooled at a relatively rapid rate through the annealing range of the glass, as by quenching the sheets in a flow of relatively cool gas.

Economic utilization of fabricating equipment requires that the glass sheets be conveyed while undergoing treatment. By supporting and conveying the glass sheets upon a fluid such as a film of gas while the glass is at or above its deformation temperature, the undesirable deformation or marring of the major surfaces now associated with current flat glass fabricating processes can be eliminated. Accordingly, glass sheets to be heated to a deformation temperature may be conveyed upon a gaseous support, and, if desired, a coating thereon may be heat cured and/or the glass may be bent to a pre-determined curvature. Thereafter the glass may be quenched to strengthen the sheet. The fluid pressure of the gas uniformly supports the glass sheet against undesired deformation and eliminates the necessity of contact by the major surfaces of the glass sheet with any solid object while the glass is subject to deformation or impairment. Quenching of the heated glass sheets is accomplished by supporting the sheets upon a flow of cool gas beneath the sheets while impinging a similar flow of cool gas upon the unsupported surface of the sheet.

Most advantageously, glass is conveyed through the heating and quenching operations by edge contact only. This is accomplished by providing a plurality of rotating disks aligned longitudinally of a predetermined gaseous support path, which disks frictionally engage a longitudinally extending edge surface of the glass sheets to convey them along the path and, in addition, define a glass index line along which the sheets are maintained in predetermined alignment.

In the operation of a high production line, zones for heating and quenching the glass sheets are of considerable length to facilitate high conveying speeds while allowing adequate processing time. Furthermore, adequate product throughput and maximum utilization of equipment is assured only by placing successive glass sheets closely adjacent each other. As a result, several sheets simultaneously undergo varying stages of processing in both the heating and quenching zones.

Not infrequently, a glass sheet will break during the quenching operation, usually due to a defect in the sheet which concentrates the stresses created by the large thermal gradient established by the flow of cool air. Once a crack or fracture in the sheet begins to develop, the sheet must be removed from the tempering section before the entire sheet shatters into the finely divided particles characteristic of tempered glass. Failure to remove the sheet before this happens will necessitate a shutdown of the line until the glass particles, which interfere with the processing of subsequent sheets, are removed.

Because several successive sheets simultaneously undergo processing in the quenching section, a broken sheet cannot rapidly be removed by merely increasing the conveying speed without affecting adjacent sheets that are not defective. Any premature removal of these adjacent sheets would be costly and wasteful. The present invention overcomes the above difficulties.

In accordance with an embodiment of this invention, glass sheets are processed through a system consisting of a preheat section wherein the glass is conveyed on rollers between radiant heaters to preheat the glass; a gas film support heating section where the glass parts are transferred to and supported on a film of hot gas while being conveyed by a frictional drive which contacts the edges only of such parts and are heated to a temperature above the deformation temperature and sufficiently high for subsequent processing; a quenching section where the glass is rapidly chilled while suspended between opposed flowing films of cool air, edge contact driving being continued through the section; and a delivery roll system which receives the tempered or otherwise processed glass parts from the quenching system for conveying to the next destination.

The present invenion provides for the selective removal of a defective sheet from the quenching section without affecting any adjacent sheets. This is achieved by selectively diverting a sheet of glass being conveyed from the predetermined conveying path in a direction generally transversely thereof. Most advantageously, this is accomplished by conveying the glass sheets upon a fluid which provides a plane of support at an angle from the horizontal in a direction transveresly of the predetermined path of travel, the sheets being maintained in predetermined alignment along said path by the rotating conveying discs located along the lower edge of the support plane. By lowering the appropriate conveying discs to a level below that of the support plane, a glass sheet may be selectively removed by virtue of its own weight and the absence of any retaining force, as supplied by the rotating discs, to maintain the sheet in predetermined alignment.

The attendant advantages of this invention and the various embodiments thereof will be readily appreciated as the same become better understood by reference to the following detailed description when considered in connection with the accompanying drawings in which.

Figures 1, 1A:
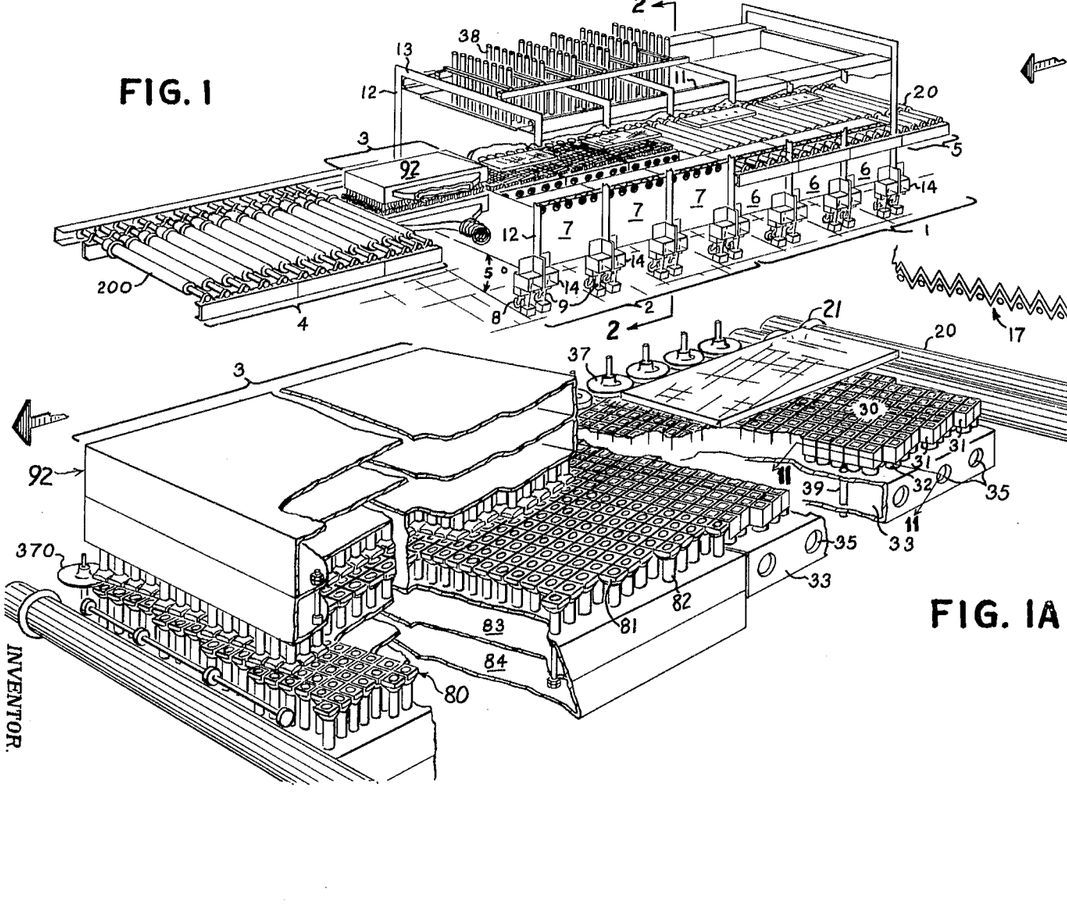
FIG. 1 is a perspective, partly schematic view illustrating a system for conveying, heating and quenching sheet glass parts.
FIG. 1A is another partly schematic perspective on a larger scale illustrating particularly how sheet glass parts are driven by discs contacting an edge of the part while it is otherwise supported entirely by a gas film over the inclined bed of FIG. 1.

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consist of a preheat section 1 wherein the glass is conveyed on rollers between radiant heaters to preheat the glass until brought to a suitable preheat temperature under the deformation temperature; a gas film support heating section 2, where the glass parts are transferred to, and supported on, a film of hot gas while being conveyed through a frictional drive contacting the edges only of such parts, supplemental heat being supplied by radiant heat sources above and below the glass until the glass reaches a temperature high enough for tempering purposes; a quenching section 3, where the glass is rapidly chilled while suspended between opposed flowing films of cool air, edge contact driving being continued through the section; and a delivery roll system 4 which receives the tempered glass parts from the quenching system and conveys them to their next destination.

Preheat section 1 includes an apron roll unit 5 for loading, the first few rolls being idle and the last driven. Next in order of the direction of travel of the workpiece are three identical enclosed preheat units 6 followed by three enclosed hot gas support heating uints 7, the quenching section 3 and the delivery section 4.

For ease in fabrication, all units 5, 6, 7 and sections 3 and 4 are assembled within rectilinear frameworks of support and mounted on casters 8 for convenience in assembly. Each unit and section is elevated from the casters 8 by jacks 9 into a position with the surfaces of all rolls and the gas support beds in a common plane tilted in a sidewise direction at an angle of five degrees with respect to the horizon as shown in FIGS. 1, 2, 6 and 7. The essential framework consists of girders 11, stanchions 12, and beams 13 resting on support blocks 14.

THE PREHEAT SECTION

Figure 2:
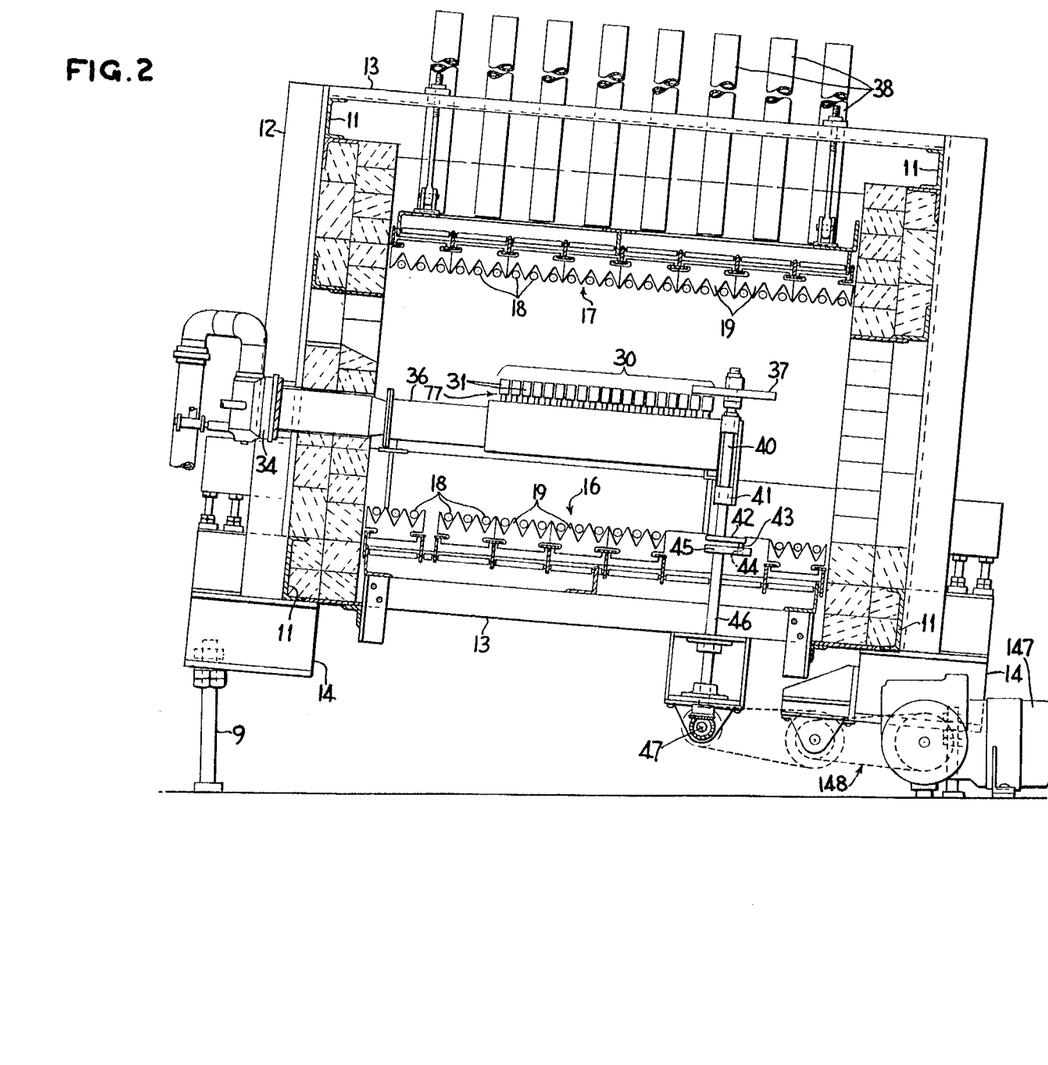
FIG. 2 is a detailed elevation view partly in section taken along the line 2—2 of FIG. 1.

Each unit 6 of the preheat section includes a radiant floor and a radiant roof similar to that of the heating section shown in FIG. 2 and built up from individual electrical heating units consisting of heating coils disposed in ceramic holders. Control is afforded so that each unit 6 may be regulated as to temperature across the path of travel and parallel thereto. Each unit is provided with a thermocouple to sense the temperature of the unit and the glass and to actuate the unit to the extent necessary to supply the required amount of heat. Conveyor rolls 20 (FIGS. 1 and 3) are provided with guide collars 21 in alignment throughout the section 1 so as to position the glass properly for transfer to the gas support next following. Each roll is journaled in bearings 22 and is driven through gears 23 from a common shaft 24 energized by drive motor 25. Temperature sensing devices placed at intervals along the path of travel of the workpiece afford data from which to establish control.

GAS FILM SUPPORT HEATING SECTION

As reflected in FIGS. 1 and 2, the gas film support heating section 2 is made up of three similar contiguous units 7, each fabricated within a supporting framework like the preheating units 6 and each having generally similar radiant floor 16 and roof 17 sections with heating coil units 18 susceptible of control by thermocouples in increments across and lengthwise of each unit.

Figure 3:
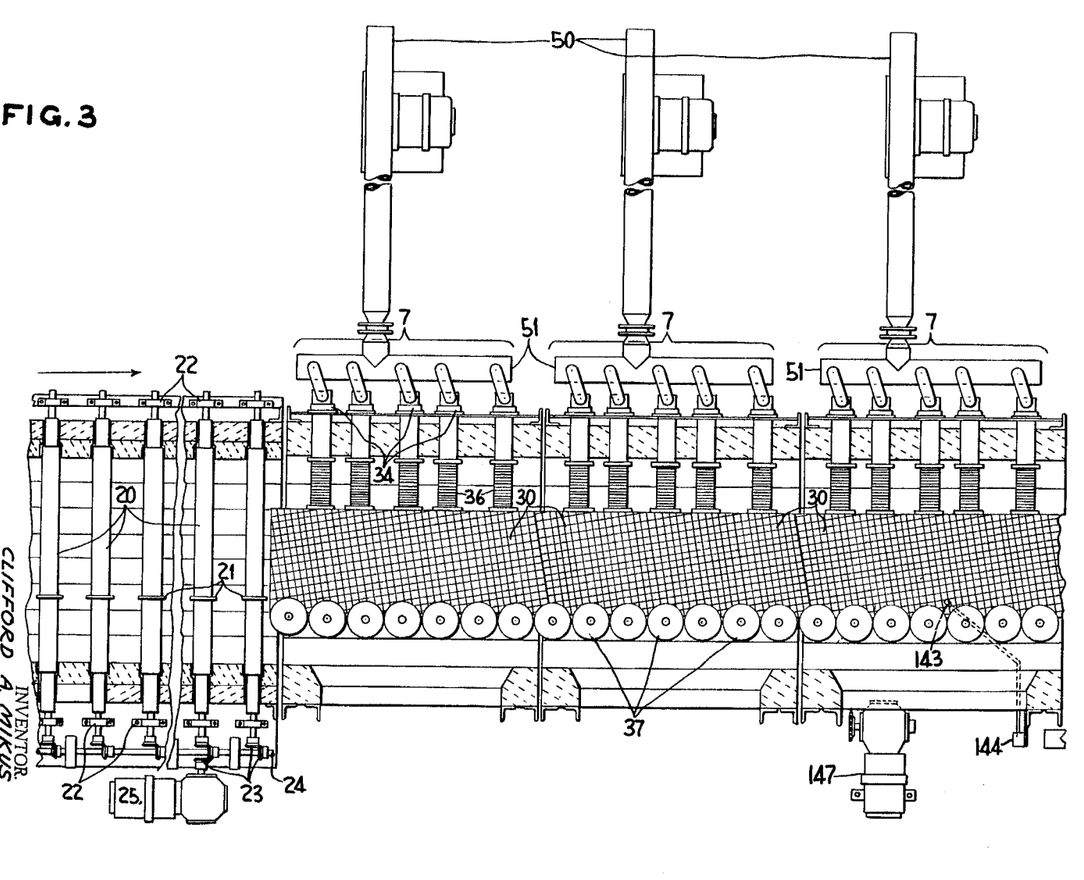
FIG. 3 is a partial plan view showing the arrangement of the preheat section with respect to the gas film support heating section, the relative positions of the burners feeding combustion gases to the plenum chambers and the mechanism for conveying glass sheets by edge contact only.

As shown generally in FIGS. 1–A, 2 and 3, each unit 7 includes a flat bed 30 of modules 31 in spaced but close juxtaposition each to the other and arranged geometrically like a mosaic. In the embodiment illustrated, all modules 31 have their upper termini of rectangular configuration and lying in a common plane. The modules 31 are arranged in successive rows crossing the intended path of travel of the workpiece, each row being at an angle other than 90 degrees from the path and spaced close to the next adjacent row as hereinafter described in more detail.

Each module 31 has a stem 32 of smaller cross sectional area than the upper terminus and each opens into a plenum chamber 33 positioned below the bed 30 and acting as a support therefor. Each module is substantially enclosed and separated from other modules by an exhaust zone. The bed is adjusted to such level that the plane of the upper termini of the modules lies parallel to, but just below by approximately the height of the gap between the modules and the support height of the glass sheet, the plane defined by the upper surfaces of the conveying rolls 20 in a preheat section 6. At one side, each plenum chamber 33 is in communication with five gas burners 34 through orifices 35 and flexible couplings 36. At the opposite and lower side of the bed 30 a series of uniform disc-like driving members 37 extend inwardly and just above the bed to frictionally engage one edge only of the workpiece and convey it along the bed in continuous straight line travel. A plurality of vents 38 project through the roof of each unit 7 to exhaust the interior to the atmosphere. Spaced intermittently in the bed 30 inboard of its margins are exhaust ducts 39 projecting through the floor of the plenum chamber 33 and communicating with the surrounding atmosphere in the furnace chamber thus serving to reduce the likelihood of pressure buildup in the central spaces between the modules 31 during the time when a workpiece overlies any substantial area of the bed. In addition, an exhaust channel 77 (FIG. 2) surrounding the module stems and disposed between the modules and the plenums provides exhaust paths to the sides of the module beds and hence to the surrounding atmosphere. Driving members 37 (FIG. 2) are mounted on shafts 40, journals 41 for which are supported by the supports for the plenum chambers. Each shaft 40 is driven through a coupling consisting of a crank arm 42 and pin 43, engaged by a slot 44 in cam 45, in turn rotated on shaft 46 which is geared to drive shaft 47. Drive shaft 47 is driven by motor 147 through a chain drive 148.

Figure 13:
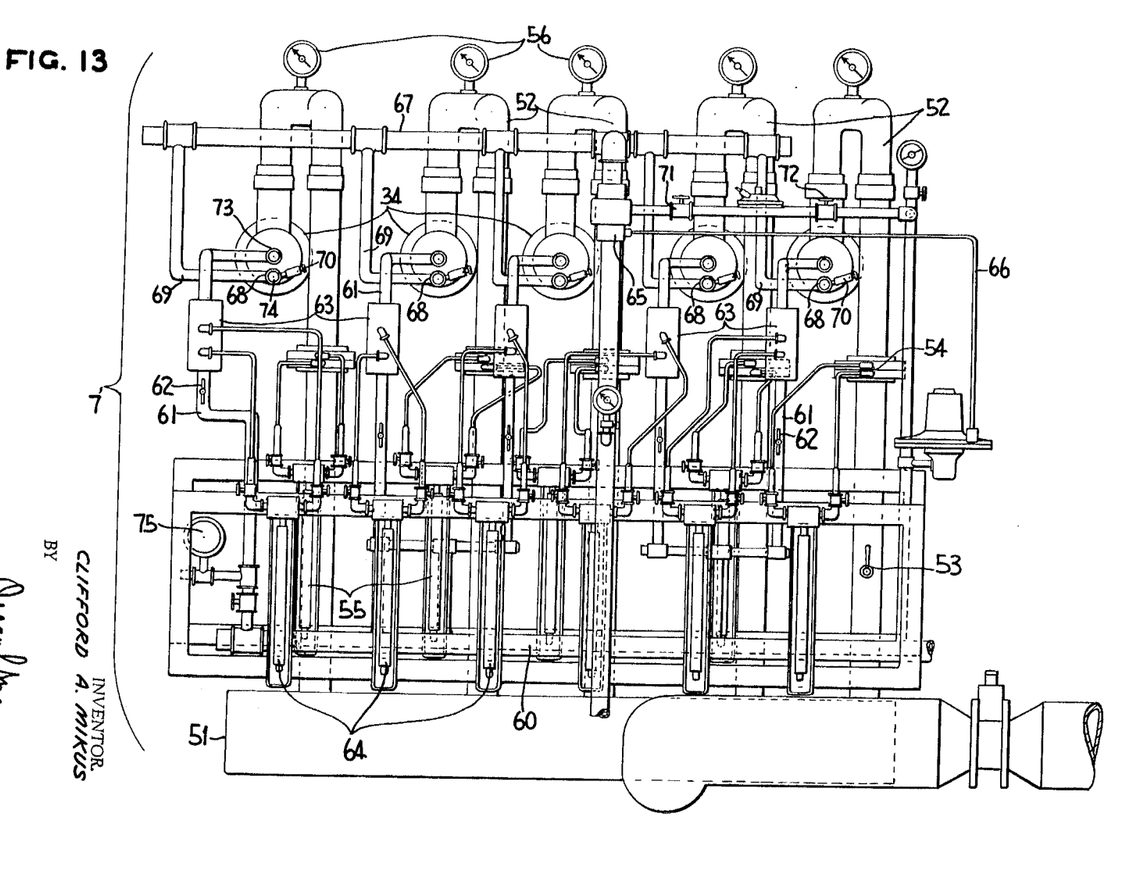
FIG. 13 is an elevation of the burners, gas and air feeds and controls for one of the three plenum chambers of the gas support heating section.

To supply air under pressure to the hot gas support combustion system, each unit 7 (FIG. 3) employs a blower 50 feeding air under pressure through a butterfly control to a manifold 51. As best shown in FIG. 13, the individual burners 34 are supplied with air from the manifold through conduits 52, each provided with a valve 53 and an orifice at 54 of known size. Pressure drop across each orifice can be measured by manometers 55 affording means to determine individual flow rates. Pressure gauges 56 permit balancing of static pressures in the air flowing to the burners.

Gas from main 60 is introduced into each burner 34 via conduits 61, each individuallly valved as at 62, and provided with flow metering devices 63 connected to manometers 64.

Each burner 34 is of the so-called direct fired air heater type. Air from blower 50 is tapped into premixer 65 and there mingled with gas supplied through pipe 66 from the main 60 from whence the mixture flows to a manifold 67 connected to burner pilots 68 by inlets 69. Each pilot 68 is provided with a continuous type spark plug 70 for ignition and safety against blowouts in addition to which each burner contains a glow tube (not shown) which remains incandescent during operation to sustain flame within the burner. Gas to the pilot premixer is controlled through needle-valve 71 and shut-off valve 72. Sight ports 73 and 74 permit visual independent inspection of the pilot flame and main flame, respectively, in each burner. Diaphragm-type safety devices 75 act to shut off all gas and air in the event of loss of either gas or air supply pressure.

The combustion of the products in the combustion chamber produces sufficient plenum pressure to supply the modules with heated gas of a uniform temperature and pressure. Adequate control of pressure and temperature are provided by correlating the rates of input of air and fuel to the burners. To supply enough gas to effect the desired support under normal conditions, an excess of air (usually 50 percent or more in excess) over that required for the combustion of the fuel gas is used. The supply of gas may be varied to change the heat input and the supply of air may be varied to change the pressure in the plenum.

The modules and plenum chamber are, in most cases, made of metal, such as iron, or like material having high heat conductivity, and the modules themselves are in good heat conductive relationship to the plenum chamber, being connected thereto.

QUENCHING SECTION

Next adjacent the gas support heating section 2 in the direction of travel of the workpiece is quenching section 3. Separating the two is a partition 79 of asbestos board or the like for the purpose of segregating, as far as possible, the hot environment of heating section 2 from the cool environment of quenching section 3. An opening, not shown, in partition 79 is provided of such size and shape as to permit transfer of the workpiece from heating section 2 to quenching section 3 with minimum transfer of heat between the two sections.

Figure 4:
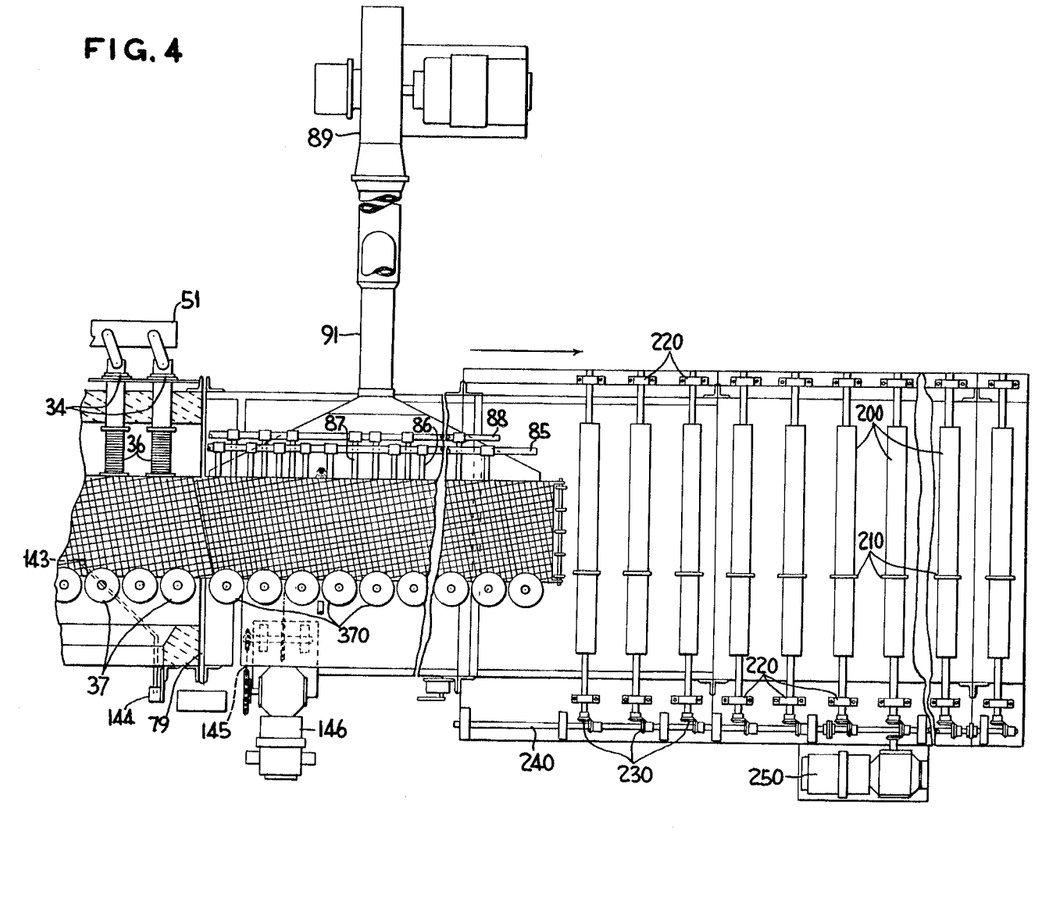
FIG. 4 is a partial plan view which is, in effect, a continuation of FIG. 3 and shows the terminus of the gas film support heating section adjacent the quenching section, the latter being followed by the conveyor roll runout sections.

As shown in FIGS. 1–A and 4, the quenching section 3 includes a flat bed of modules 80 arranged in mosaic pattern similar to that of the gas film support heating bed, but varying therefrom in certain respects hereinafter explained in detail. Each module 81 has a long stem 82, smaller in cross section than the upper terminus, which projects through a cooling box 83 into a plenum 84, the cooling box and upper surface of the plenum acting as a support for the modules. The surface of the upper termini of the modules is adjusted to such level that it lies at the same level and in the same contour as that of the end portion of the gas film heating bed next preceding.

Heat exchange fluid, such as cooling water, from inlet manifold 85 is introduced into the heat exchange box 83 through a plurality of pipes 86 and discharged through pipes 87 into an outlet manifold 88. Relatively cool gas, such as air at ambient temperature, is supplied to the plenum via blower 89 and duct 91.

Above the bed 80 and supported in such fashion as to be capable of being raised and lowered is a head assembly 92 (FIGS. 1, 1A, 5 and 6) which, in essence, constitutes a mirror image of the bed 80 and its associated heat exchange box 83 and plenum chamber 84 and which, in turn, is supplied separately with heat exchange fluid and air in like manner.

The conveying means for the quenching system includes disc-like driving members 370 having a sufficiently narrow peripheral edge to extend inwardly and between the upper and lower module beds to frictionally engage one edge only of the workpiece and convey it along the bed in continuous straight line travel. Drive discs 370 are mounted for rotation on upright shafts 400 (FIGS. 5, 6 and 7) which are gear-driven at their opposite end by spacel bevel gears 404 mounted along horizontal drive shafts 470, 480 and 490. The upright disposition of the parts varies from the vertical by the angle at which the support bed is tipped from the horizontal. Bevel gears 404 mesh with bevel gears 402 suitably fastened to the lower end of upright shafts 400. Shafts 400 are generally vertically positioned and rotatably mounted in suitable journals 408 and 409 mounted on support members 410.

Figure 5:
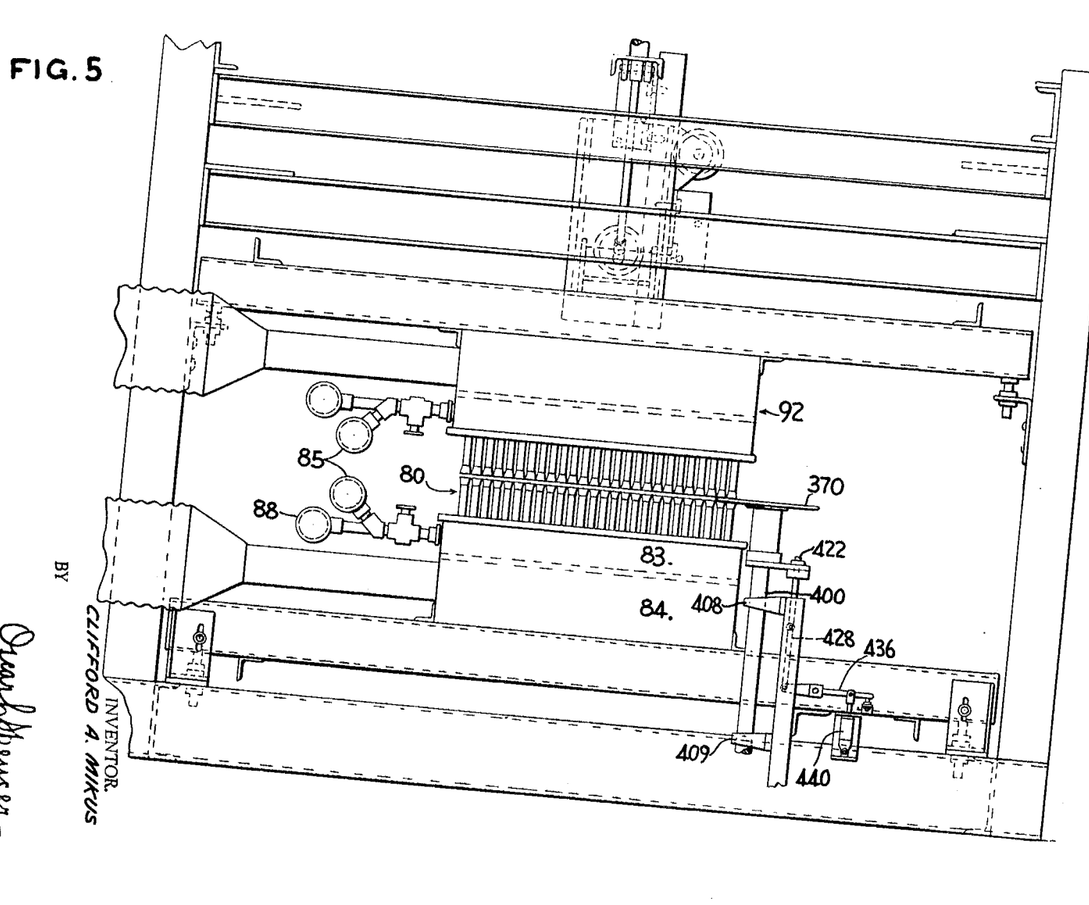
FIG. 5 is an end elevation of the quenching system showing the relationship of the upper and lower heads and the mechanism for conveying glass sheets by edge contact only.
Figure 6:
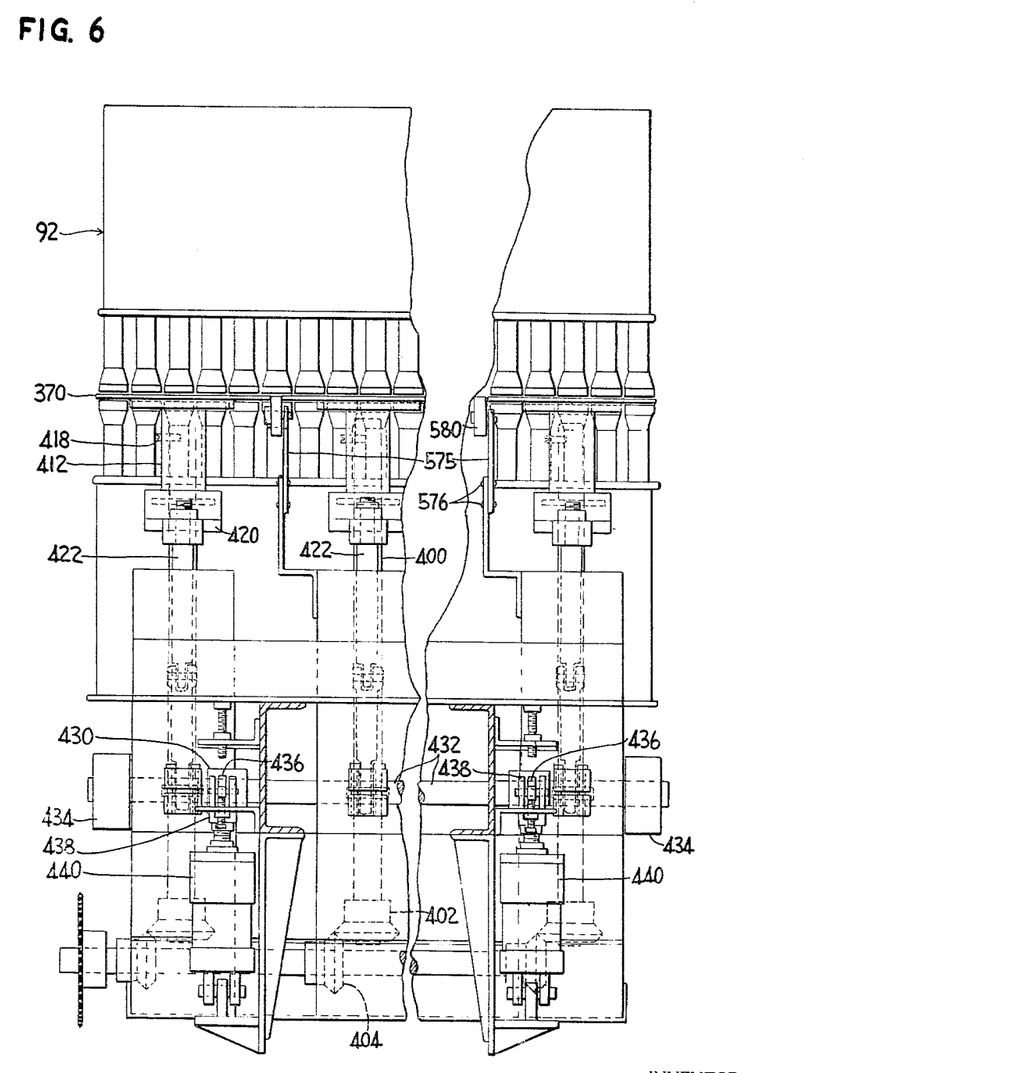
FIG. 6 is a partial side elevation of the system of FIG. 5 showing in detail one embodiment of a mechanism for raising and lowering the drive discs.
Figure 7:
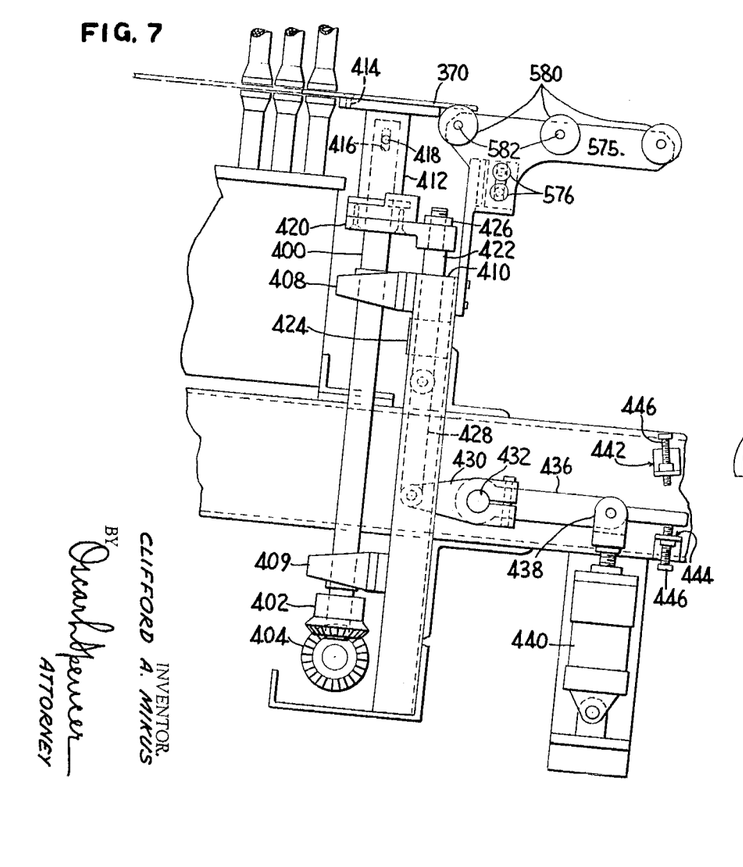
FIG. 7 is an enlarged view of the drive mechanism shown in FIG. 5.
Figure 8:
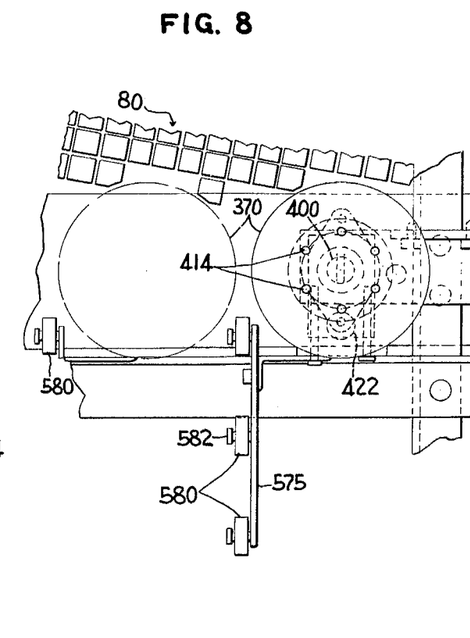
FIG. 8 is a partial plan view of the lower quench bed showing the drive discs and the edge arrangement of the support modules which allows the discs to be lowered.

An outer sleeve 412, to which a disc 370 is suitably fastened as by screws 414, surrounds the upper end of each drirve shaft 400. An elongated vertical slot 416 extending through sleeve 412 receives a pin 418 extending from shaft 400 so as to rotate with shaft 400 while being free to move vertically with respect thereto. A vertically moveable horizontally extending arm 420 attached at one end to a sliding rod 422 supports each outer sleeve 412 for vertical movement while allowing it to freely rotate. Each rod 422 is slideably received in a bearing 424 for vertical movement between an upper and lower position. The upper extremity of each rod 422 is fastened to an arm 420 by a nut 426. Pivotally mounted to the lower end of each sliding rod 422 is a link 428 connecting each rod 422 with an arm 430 extending from one of a plurality of longitudinally aligned, horizontally disposed actuating shafts 432 suitably supported for rotation on the framework of the structure by bearings 434. Actuating shafts 432 are rotatable about their longitudinal axes between two predetermined positions by cranks 436, each of which is fixedly attached to a shaft 432, extends outwardly therefrom and is fastened intermediate its ends to a clevis 438 fastened to the rod end of an air cylinder 440. The end of each crank 436 extends beyond the clevis 438 and cooperates with abutments 442 and 444 having adjustable screws 446 which control the rotation of actuating shafts 432 and hence the extent of the generally upright movement of drive discs 370.

As indicated in FIG. 6, each of a plurality of actuating shafts 432, two of which are partially shown, is actuated by a double-acting air cylinder 440 and each controls a plurality of drive discs 370. These shafts are arranged longitudinally of the quenching section so as to permit a predetermined number of consecutive drive discs 370 in a predetermined position along the quenching section to be simultaneously lowered upon the actuation of one or more air cylinders. Each cylinder is actuated by a manual switch controlling a solenoid actuated four-way air valve in a manner well known in the art.

Figures 9, 11, 12:
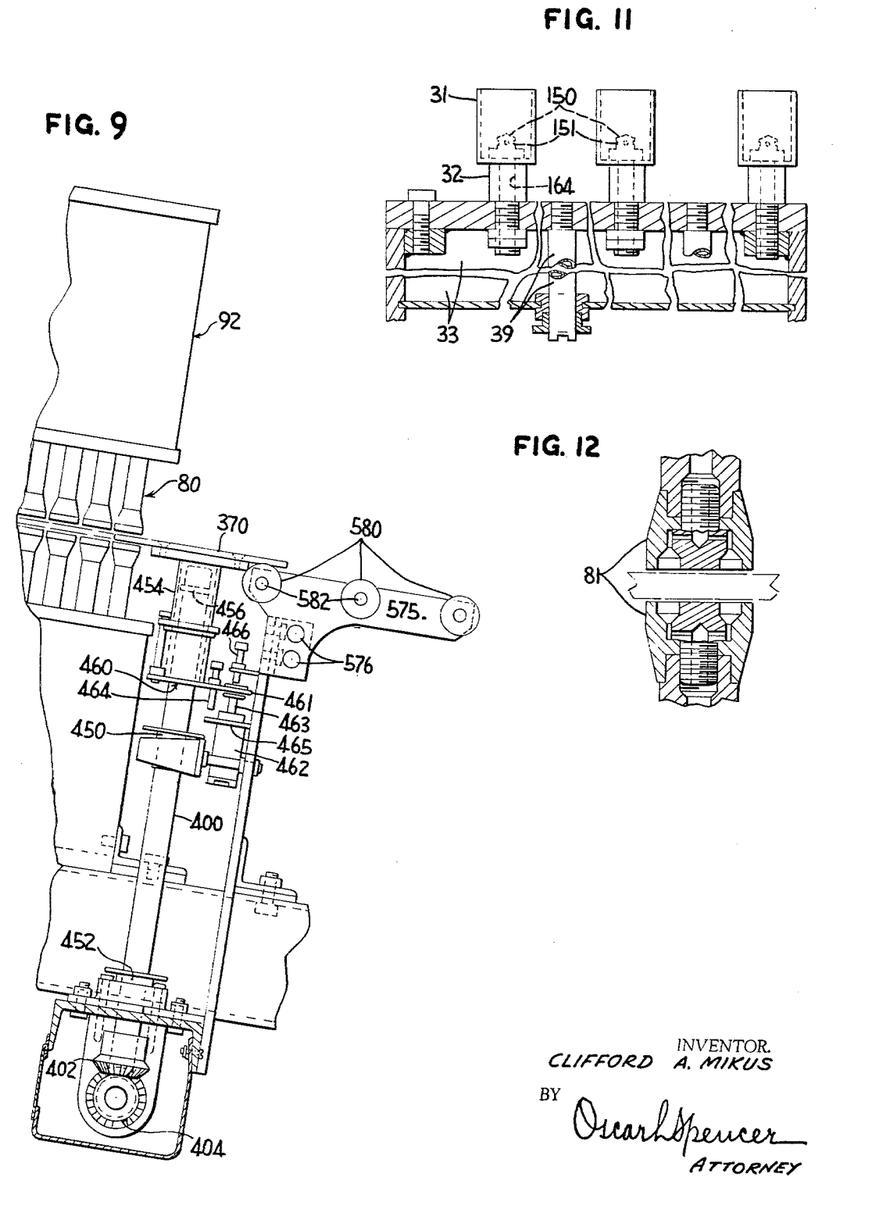
FIG. 9 is an end elevation view similar to FIG. 7 but showing a second embodiment of the disc lowering mechanism.
FIG. 11 is a sectional view taken along line 11—11 of FIG. 1A showing the construction of the modules of the heating section and the plenum chamber.
FIG. 12 is an approximately full scale sectional detail illustrating elements of quenching module design.

An alternative embodiment for mounting drive discs 370 for vertical movement is disclosed in FIG. 9. In this embodiment, upright or generally vertical drive shafts 400 are supported and journaled in bearings 450 and 452 suitable fastened to the framework of the structure. Outer sleeves 454 support driving discs 370 and are rotatably driven by and vertically slideable upon drive shafts 400, as by the cooperation between vertically extending slots 458 on the inner surfaces of sleeves 454 and pins 456 fastened to shafts 400. Each outer sleeve 454 is vertically supported by and freely rotatable in a supporting arm 460. An outwardly extending end 461 of arm 460 is suitably fastened to the rod 463 of an air cylinder 462. Set screw 464, mounted intermediate the ends of supporting arm 460, limits the downward movement thereof by virtue of abutment 465, and set screw 466, mounted to the supporting frame, is in the upward path of and hence limits the upward movement of supporting arm 460.

In this embodiment, each drive disc 370 has associated therewith a separate air cylinder 462 which independently controls the movement of each drive disc between an upper and lower position. However, for ease of operation, a plurality of air cylinders may be grouped for control by a single control switch so that a proper number may be conveniently actuated at one time to facilitate the removal of a glass sheet. With this embodiment, the grouping of the pluralities of discs to be lowered under a single control may be conveniently changed by merely rearranging the air connections of the cylinders with respect to the operating switches.

Common to each of the above-described embodiments for lowering the quench drive discs are horizontally extending roller support plates 575, suitably supported on frame members as by bolts 576. Three rollers 580 are rotatably mounted on support plates 575 by axles 582. The upper peripheries of rolls 580 define a glass support plane which is at a slightly lower elevation than the support plane of the module bed. These rollers are located along the lower side of the quench section adjacent the driving discs 370 and provide a support extention along the lower edge of the quench section. The longitudinal spacing of adjacent support plates 575 is dependent upon the minimum size of the glass sheets to be conveyed, and the plates are spaced close enough that at least two will underlie any sheet that is allowed to move transversely out of the quenching section. In this manner, rollers 580 provide a supporting apron for transversely moving glass sheets when conveying discs 370 are lowered and in this manner prevent a premature tipping of such glass sheets and the accompanying contact of such sheets with the upper module bed. In the embodiments shown, the glass sheets removed are allowed to fall to the floor after passing over rollers 580. If desired, of course, further conveying apparatus may be provided to extend the conveying path provided by rollers 580 to any extent necessary or desired.

Figure 10:
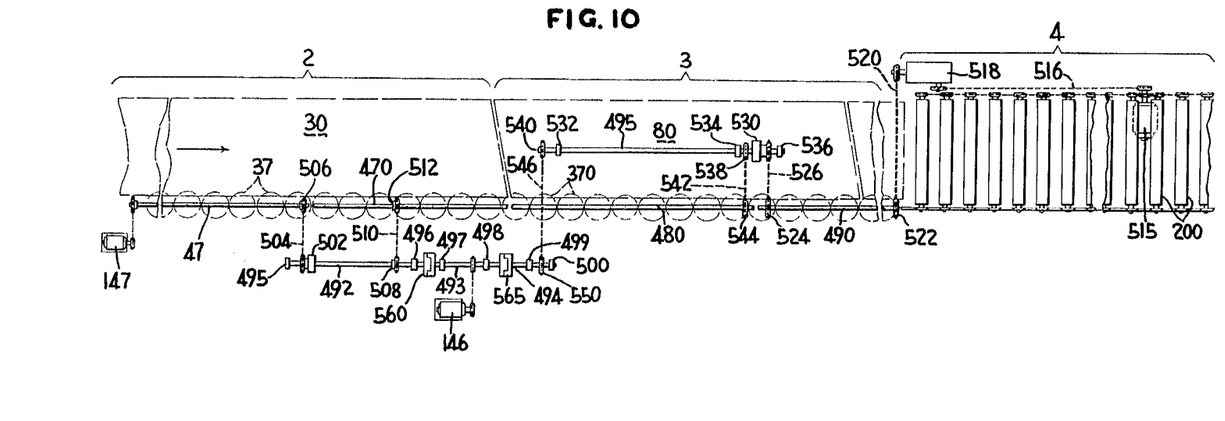
FIG. 10 is a schematic, partial plan view of the terminus of the gas film support heating section, the quenching section and the beginning of the conveyor roll runout section showing the drive arrangement used to vary the speed of the driving discs during the runout of parts from the heating to the quenching section.

With reference now to FIG. 10, it will be seen that separate drive shafts are used to drive the last several discs of the heating section and the first several discs of the quench section. This allows for a rapid transfer of glass sheets from the heating section to the quenching section. Thus, drive shaft 47, driven by motor 147, is associated with drive discs 37 of the heating section except for the last seven discs thereof. Separate drive shaft 470 is associated with the last seven discs 37 of the heating section, drive shaft 480 is associated with the first eight drive discs 370 of the quenching section, and drive shaft 490 is associated with the remaining discs 370 of the quench section. Three auxiliary transmission shafts 492, 493 and 494 transmit power to drive shafts 470, 480 and 490.

Auxiliary transmission shafts 492, 493 and 494 are longitudinally aligned and suitably journaled for rotation in bearing blocks 495, 496, 497, 498, 499 and 500. An overrunning clutch 502 on transmission shaft 492 permits shaft 492 to be driven by shaft 47 through chain 504 and sprocket 506 attached to shaft 47. Shaft 492 then transmits power to drive shaft 470 through a sprocket 508, a chain 510 and a sprocket 512 attached to drive shaft 470. An electric clutch 560 provides selective coupling between shaft 492 and shaft 493. A similar electric clutch 565 selectively couples shaft 493 with shaft 494. Shaft 493 is continuously driven by drive motor 146 at a higher speed than either of shafts 492 or 494 when they are driven from drive motors 147 and 515, respectively.

Turning now to the downstream end of the quench section, it will be seen that drive shaft 490 is rotatably driven by drive motor 515 through chain 516, transmission 518, chain 520 and sprocket 522 attached to shaft 490. Drive motor 515 also drives rolls 200 of the delivery section. At the upstream end of drive shaft 490, a second sprocket 524 is attached thereto and drives auxiliary transmission shaft 495 through chain 526 and overrunning clutch 530. Auxiliary shaft 495 is suitably supported for rotation by journals 532, 534 and 536 and has attached thereto two sprockets 538 and 540. Sprocket 538 drives drive shaft 480 through chain 542 and sprocket 544 attached to shaft 480. A chain 546 connects sprocket 540 of auxiliary transmission shaft 495 with a sprocket 550 of auxiliary transmission shaft 494.

When electric clutch 560 is energized, auxiliary transmission shaft 492 is driven by shaft 493 at an increased speed over that of shaft 47, and, through sprocket 508, chain 510 and sprocket 512 attached to drive shaft 470, shaft 492 drives the last seven discs 37 of the heating section at an increased speed. Overrunning clutch 502 on shaft 492 prevents the increased speed of rotation from affecting drive discs 37 driven from drive shaft 47. In a similar manner, when electric clutch 565 is energized, the high speed of rotation of auxiliary transmission shaft 493 is transmitted to shaft 494, thereby rotating auxiliary transmission shaft 495 and drive shaft 480 at an increased speed to drive the first eight drive discs 370 of the quench section at a greater rate for a high speed runout of the glass from the heating section to the quenching section. Overrunning clutch 530 on shaft 495 prevents the higher speed of rotation from being transmitted to drive shaft 490 and thus allows the remaining quench drive discs 370 to maintain normal processing speeds.

Electric clutches 560 and 565 are controlled in their operation by a pressure sensitive switch 144 (FIG. 3) and a timer mechanism (not shown). Positioned at the corner of one module near the end of the heating section is a pressure sensing element 143 which is sensitive to the presence of a glass sheet and which operates switch 144 connected to the timer mechanism. This mechanism operates to energize electric clutches 560 and 565 to increase the speed of rotation of the last seven discs 37 of the heating section and the first eight discs of the quench section and thereafter to successively deenergize the clutches at the proper time, as will be more fully explained in the description of the operation.

DELIVERY SECTION

As shown in FIG. 1, the delivery roll section 4 consists of conveyor rolls 200 provided with guide collars 210 in alignment with discs 370 of the quench section to maintain the proper position of the glass during transfer therefrom. Each roll is journaled in bearings 220 and is driven through gears 230 from a common shaft 240 energized by drive motor 250.

MODULE BEDS

In accordance with an embodiment of this invention, highly developed and refined supporting apparatus have been provided to prevent the distortion of glass at deformation temperature, an important achievement not accomplished by known conveying apparatus and processes, including known air film support devices. Specifically, a plurality of open-topped chambers or modules are positioned closely adjacent to each other but spaced and with their upper termini defining a support plane evenly spaced therefrom and resulting from the uniform pressure created from a uniform flow of diffused gas from each module and exhausted through passageways between adjacent modules to the atmosphere.

As more specifically indicated by the embodiment depicted in FIG. 11, each module 31 forms an open-topped chamber being essentially closed on its other sides, the upper terminus of which defines a zone of substantially uniform fluid pressure beneath the overlying glass. The pressure is exerted by gas supplied to each module from the supporting plenum chamber by way of the hollow supporting stem 32. A nozzle 150, in threaded engagement with an opening in the base of the module 31 and having a bore connected with the bore 164 of module stem 32, provides a gas inlet to the module chamber and also functions to diffuse the gas by changing the direction of flow to a horizontal direction as the gas escapes and expands into the module chamber through a plurality of bores or orifices 151 in the nozzle. The orifices 151 are so disposed to prevent direct impingement of pressurized gaseous fluid against the supported glass surface so as to prevent dimpling of the glass from the velocity pressure of a localized jet of gas. They deliver the gas to the module in a path which is initially out of the path of the glass. As shown in FIG. 11, the initial path is toward the module side wall below the upper edge thereof. However, the initial path may be downward, or as horizontal spiral, or may be baffled or otherwise obstructed as long as it does not initially impinge against the glass. By feeding the support gas into the large module chamber through a conduit or orifice which is smaller in cross section than the module, the gas diffuses into the gas of the chamber, producing a diffused flow, thus ensuring uniform pressure across the upper edges of the module.

The quench modules 81, two of which are shown in detail in FIG. 12, are positioned both above and below the glass sheets being processed. While these modules function in substantially the same manner as the heating modules 31, they are constructed somewhat differently to enhance the heat transfer characteristics.

OPERATION

In operation, and by way of example only, sheets of glass are placed one after the other upon apron roll unit 5 properly aligned by guide collars 21 and conveyed on rolls into and through preheat unit 6 where electric heating coils 18 above and below the moving glass supply heat to the preheat section to raise the temperature of the glass to near the deformation range thereof.

As the leading edge of the glass sheet leaves the last roll of the preheat section and progressively covers modules 31 forming support bed 30, the sheet becomes partly and finally fully supported by the uniform pressure of the gas emitted from the modules. The modules are oriented at an angle from normal to the path of travel to assure even heating of the glass and to assure that the edges of the glass sheets are at all times supported at least at spaced positions. Once the glass becomes gas supported, it is conveyed by edge contact through frictional engagement of its lower edge with rotating drive members 37. For this purpose, the entire system is positioned on a common plane tilted at an angle of approximately 5° with respect to the horizon to provide the glass with a component of force normal to the driving discs. The glass is conveyed at a rate of approximately 2½ inches per second.

Gas burners 34 are supplied natural gas and an excess of air over that required for complete combustion, and the products of combustion are introduced to the plenum chambers and from there fed to the modules where the pressure is reduced and the gas flow diffused to form the supporting pressure zones.

To heat the glass, heat is added convectively and radiantly from the supporting gas which is at a temperature of approximately 1200 degrees Fahrenheit and is added radiantly into the chamber from ceiling heating coils 18 at a temperature of about 1300 degrees Fahrenheit. In this manner the glass is heated to approximately 1200 degrees Fahrenheit.

Near the end of the heating section, the leading edge of the glass passes over the sensing element 143 of pressure switch 144 and a timer on a control mechanism begins to run. The timer is adjusted for the particular speed at which the glass is being conveyed to actuate the high speed runout when the leading edge of the glass reaches the end of the heating section. At this time, electric clutches 560 and 565 are energized to operate the last seven discs 37 of the heating section and the first eight discs 370 of the quenching section at an increased speed. In this manner, the glass sheet is rapidly conveyed from the heating section to the quenching section at a rate of approximately 10 inches per second. As soon as the trailing edge of the glass sheet leaves the last roll 37 of the heating section, electric clutch 560 is deenergized and the last seven rolls of the heating section returned to their normal drive speed. The first eight driving discs 370 of the quench section continue to operate at high speed until the leading edge of the glass sheet approaches the eighth disc and the trailing edge thereof is well within the quench section. At this time, electric clutch 565 is deenergized by the timer to return the first eight drive discs 370 of the quench section to the normal conveying speed to allow ample time for quenching and to prevent interference between the glass sheet being transferred and any preceding glass sheet being conveyed at the normal rate.

In the quenching section, air at ambient temperature of approximately 100 degrees Fahrenheit is supplied to upper and lower plenum chambers to provide adequate support for the glass as well as sufficient convective cooling to temper the glass. Water is circulated through cooling boxes 83 to stabilize the temperature of the quench modules.

The module rows of the quenching section are oriented at a slight angle from normal to the path of travel to support the edges of the glass in a manner explained with respect to the heating section and to assure even cooling of the glass over the entire surface thereof to minimize the formation of an iridescent stress pattern in the glass.

In the normal operation, the glass, while traveling through the quench section, will be lowered in temperature through the annealing range in about 15 to 30 seconds. The glass leaves the quenching section at a temperature of below 600 degrees Fahrenheit and is no longer deformable. It is then conveyed from the air support of the quenching system to the rolls of the delivery system by discs 370 and thence to their next destination.

Should breakage occur in a sheet of glass as it is being conveyed in the quench section, it is rapidly removed therefrom by lowering the drive discs 370 which are in contact therewith at the time the crack or break is noticed. This is accomplished by an operator who pushes a reject button or operates a reject lever controlling the air cylinder or cylinders that operate the proper drive discs 370. Because the conveying bed is angled transversely of the path of travel, the weight of the glass sheet exerts a component of force against the conveying discs 370. When these discs are lowered, this component of force tends to move the glass sheet transversely of the path of travel across the rollers 580 which maintain the sheet in a predetermined plane to prevent the sheet from tipping and contacting the upper module bed. As the sheet passes across rollers 580 and clears the module bed of the quench section, it is free to fall to the floor and be disposed of. The operator then restores the lowered drive discs to their proper drive position by releasing the reject button, thereby causing the air cylinder to return the discs to their raised position.

VARIATIONS

While in the foregoing description illustrative embodiments of this invention have been disclosed, in many instances it is possible to alter the constituents or substitute equivalents therefore to obtain substantially the same results in substantially the same way.

For example, conventional air support tables could be substituted for the module bed where quality considerations do not dictate the uniformity of support or other features characteristic of the disclosed support bed. If desired, the drive discs of the heating section may also be constructed to lower, in a manner disclosed herein with respect to the drive discs of the quench section.

This invention is equally applicable to an air film support used only for the purpose of conveying. In such an application, the rotating discs might be used to convey sheets of material along one predetermined path and selectively remove sheets from the path by being lowered to allow them to slide transversely thereof onto a branch path at right angles to the main distributing path. Thus, this invention is applicable to wareroom operations where glass sheets may be inspected and distributed or conveyed to different stations for various processing steps or storage.

While it has been found particularly convenient and advantageous to tilt the conveying line, thereby facilitating not only the conveying operation but also the removal of defective glass sheets, it will be realized that other means of providing a transverse force will be readily apparent to those skilled in the art.

It will further be evident that the applicability of this invention is not limited to the use of discs to supply the motive force to the glass sheets or sheets of other material. For example, one or more moving endless belts could be used to engage and move the edge of the glass. Where several independent belts are used in succession, they can be independently controlled and be lowered below the support level of the glass to allow removal thereof. The use of belts is particularly advantageous where the glass sheets being conveyed present no flat edge of sufficient length to bridge the gap from one disc to the next.

It will also be apparent that the discs or belts need not apply the motive force to the glass. Rather, the support bed may be tilted in the direction of glass travel, and in such an instance the discs or endless belts may be utilized to retard the speed of travel imparted by gravitational force to assure proper spacing and adequate treatment of the glass sheets in the different sections.

It should be evident from the above section that while in the foregoing disclosure certain preferred embodiments of the invention have been disclosed, numerous modifications or alterations may be made therein without departing from the spirit and scope of the invention as set forth in the appended claims.

What is claimed is:

1. In a method of transporting sheets of material along a predetermined path, the steps comprising:
   (a) supporting said sheets for movement along said path on a fluid,
   (b) moving said sheets along said path while supported by said fluid,
   (c) providing a component of force tending to move said sheets transversely of said path, and
   (d) allowing movement of selected sheets transversely and out of said path by removing the component of force tending to so move the selected sheets while preventing such movement of others of said sheets,
   (e) whereby selected sheets being transported along said path may be diverted from the remainder of the sheets moving along said path.

2. In a method of transporting sheets of material along a predetermined path, the steps comprising:
   (a) supporting said sheets on a fluid with one edge of said sheets extending longitudinally of the path and at a lower level than the other portions of the sheet,
   (b) frictionally imparting motion to said sheets along said path,
   (c) guiding said sheets along said path at the lower longitudinally extending edge of each sheet to prevent movement transversely of said path, and
   (d) selectively permitting movement of said sheets transversely of said path in a direction toward said lower edge to remove said sheets from said path.

3. In a method of transporting sheets of material along a predetermined path, the steps comprising:
   (a) supporting said sheets on a fluid,
   (b) imparting motion to said sheets along said predetermined path,
   (c) guiding said sheets along said path at a longitudinally extending edge of the sheets, and
   (d) selectively removing said sheets from said path in a direction transversely thereof.

4. In a method of transporting sheets of material along a predetermined path, the steps comprising:
   (a) supporting said sheets on a fluid,
   (b) imparting motion to said sheets along said predetermined path,
   (c) guiding said sheets along said path at an edge of each sheet which extends longitudinally of said path, and
   (d) selectively resisting and allowing movement of said sheets transversely of said path of travel.

5. The method of claim 4 wherein movement of one or more sheets transversely of said path of travel is allowed in response to a break in the one or more said sheets.

6. Apparatus for transporting sheets of material along a predetermined path, including:
   (a) means for supporting said sheets upon a fluid and inclined from the horizontal, said means including a support bed extending longitudinally of said path and inclined transversely thereof,
   (b) means located along a lower longitudinally extending edge of said support means for frictionally engaging edges of said sheets to propel and guide said sheets longitudinally along said path, and
   (c) means operatively associated with said last-mentioned means for selectively removing said last-mentioned means from engagement with the edges of said sheets,
   (d) whereby said sheets are permitted to move transversely of said path over the lower edge of said support means.

7. Apparatus for transporting sheets of material along a predetermined path, including:
   (a) a mosaic of fluid-emitting outlets having upper termini lying along a common generative surface which is inclined, in a direction transversely of the predetermined path, from a horizontal plane;
   (b) means to supply fluid under pressure to said outlets;
   (c) a plurality of rotatable discs movable between an upper and a lower position, said discs being in substantially longitudinal alignment along said path adjacent a lower edge of said surface and constructed and arranged to frictionally engage to propel and guide said sheets along said path when in said upper position and being below said surface and out of engagement with said sheets when in said lower position,
   (d) drive means to rotate said discs, and
   (e) means for selectively moving said discs from one of said upper and lower positions to the other.

8. In a method of conveying, the steps comprising:
   (a) supporting a sheet of material at an angle inclined from a horizontal plane in a direction transversely of an intended path of travel,
   (b) moving the sheet along the intended path of travel, and
   (c) selectively resisting movement of the sheet transversely of said path.

9. In a method of conveying a sheet of glass, the steps comprising supporting the glass sheet upon a fluid, moving said sheet along a path of travel while so supported and, in response to a break in said sheet, moving said sheet transversely of said path travel.

10. In a method of conveying a glass sheet, the steps comprising supporting the sheet on a fluid in a plane of support at an angle inclined from a horizontal plane, moving said sheet along a path in a direction transversely of the direction in which the sheet is inclined and maintaining the sheet in alignment along said path by engaging a lower edge of the sheet with drive members in horizontal alignment along said path, moving the drive members from a driving position in contact with a lower edge of the glass sheet to a position out of contact with said sheet in response to a break in the sheet to permit the sheet to move transversely of the path and off the fluid support, and thereafter returning the drive members to the driving position.

11. The method of claim 10 wherein the drive rolls are moved downwardly from the plane of support of the sheet to permit transverse movement of said sheet.

12. The method of claim 10 wherein the glass sheet permitted to move transversely of the path of travel and off the fluid support is maintained in said plane of support during said movement until substantially the entire sheet is out of said path.

13. Apparatus for transporting glass sheet along a predetermined path, including means for supporting the sheets upon an elongated fluid path at an angle inclined from the horizontal and transversely of the path, stop members adapted to engage the sheets and restrain transverse movement out of the path along said incline, means to propel the sheets longitudinally along the path, and means to disengage the stop members whereby to allow selected sheets to slide laterally from said path.

14. A method of treating glass sheet which comprises supporting the sheets on a fluid path in a successive series and at an angle inclined from the horizontal transversely of the path, maintaining a temperature differential between the sheets and the fluid whereby to transfer heat between the sheets and the fluid while moving the sheets along the path while restraining movement of each sheet down the incline and, in response to a break in the sheet, releasing such restraint upon the broken sheet to permit the broken sheet to slide down the incline out of the path of movement of the remaining sheets.

15. In a method of transporting sheets of material, the steps comprising:
(a) establishing an elongated fluid support path for said sheets,
(b) supporting a series of spaced sheets upon said fluid support path,
(c) moving individual spaced sheets of said series of sheets along said path while the sheets are supported upon the fluid support, and
(d) selectively diverting individual sheets of said series of sheets from said path while
(e) continuing to move other individual sheets of said series along said path.

References Cited by the Examiner
UNITED STATES PATENTS

| 1,140,782 | 5/1915 | Welton | 209—90 |
|---|---|---|---|
| 2,805,898 | 9/1957 | Willis. | |
| 2,975,701 | 3/1961 | Munschauer. | |

SAMUEL F. COLEMAN, *Primary Examiner.*

WILLIAM B. LABORDE, *Examiner.*